United States Patent
Ganapathy et al.

(10) Patent No.: US 10,836,513 B2
(45) Date of Patent: Nov. 17, 2020

(54) MICROWAVE ELECTROTHERMAL THRUSTER ADAPTED FOR IN-SPACE ELECTROTHERMAL PROPULSION

(71) Applicant: JSW Steel Limited, Mumbai (IN)

(72) Inventors: Rohan M. Ganapathy, Bellary (IN); Vinod Nowal, Bellary (IN)

(73) Assignee: JSW Steel Limited, Maharashtra (IN)

( * ) Notice: Subject to any disclaimer, the term of this patent is extended or adjusted under 35 U.S.C. 154(b) by 232 days.

(21) Appl. No.: 15/776,613

(22) PCT Filed: Nov. 17, 2016

(86) PCT No.: PCT/IN2016/050409
§ 371 (c)(1),
(2) Date: May 16, 2018

(87) PCT Pub. No.: WO2017/085746
PCT Pub. Date: May 26, 2017

(65) Prior Publication Data
US 2018/0327118 A1    Nov. 15, 2018

(30) Foreign Application Priority Data
Nov. 18, 2015   (IN) .......................... 4333/MUM/2015

(51) Int. Cl.
*B64G 1/40*   (2006.01)
*B64G 1/42*   (2006.01)
(Continued)

(52) U.S. Cl.
CPC ............. *B64G 1/409* (2013.01); *B64G 1/405* (2013.01); *B64G 1/42* (2013.01); *F03H 1/0093* (2013.01); *B64G 1/26* (2013.01)

(58) Field of Classification Search
CPC ........ B64G 1/405; B64G 1/409; F03H 1/0093
See application file for complete search history.

(56) References Cited

U.S. PATENT DOCUMENTS 3,366,805 A * 1/1968 Marshall ................... H01P 1/15
                                                              327/181
4,507,588 A * 3/1985 Asmussen ............... H01J 27/16
                                                              219/121.47
(Continued)

FOREIGN PATENT DOCUMENTS

WO    2005028310 A2    3/2005

OTHER PUBLICATIONS

International Search Report and Written Opinion dated Apr. 14, 2017 for related PCT App. No. PCT/IN2016/050409.

*Primary Examiner* — Philip J Bonzell
*Assistant Examiner* — Tye William Abell
(74) *Attorney, Agent, or Firm* — D'Ambrosio & Menon, PLLC; Usha Menon (57) ABSTRACT

The present invention relates to a Microwave Electrothermal Thruster(MET) adapted for in-space electrothermal propulsion comprising a tunable frequency Microwave Electrothermal Thruster propulsion module enabling primary propulsion and altitude control of a satellite/spacecraft wherein RF Semiconductors is introduced for the first time as microwave generator inside cavity body to increase its efficiency and respond time and to make the thruster capable of operating in two frequencies by mechanically tuning its cavity making such thruster compact and light weight. The free-floating plasma within the resonant cavity couples the incident electrical power directly to the tangentially injected propellant gas. The plasma forms by focusing the microwave energy into the first transverse magnetic mode and operates independent of the type of propellant gas used. Also, for the first time, Shape Memory Alloy is introduced into the thruster cavity to enable faster and effective tuning of the resonant cavity diameter, when switching between two operational frequencies.

18 Claims, 9 Drawing Sheets

(51) Int. Cl.
*F03H 1/00* (2006.01)
*B64G 1/26* (2006.01)

(56) References Cited

U.S. PATENT DOCUMENTS

| | | | | |
|---|---|---|---|---|
| 4,906,900 | A | * | 3/1990 | Asmussen ................ H05H 1/46 |
| | | | | 315/111.81 |
| 5,146,742 | A | | 9/1992 | Iida et al. |
| 5,956,938 | A | * | 9/1999 | Brandenburg ........ F03H 1/0093 |
| | | | | 60/203.1 |
| 2008/0093506 | A1 | | 4/2008 | Emsellem et al. |

* cited by examiner

MICROWAVE ELECTROTHERMAL THRUSTER ADAPTED FOR IN-SPACE ELECTROTHERMAL PROPULSION

FIELD OF THE INVENTION

The present invention relates to a Microwave Electrothermal Thruster adapted for in-space electrothermal propulsion comprising a tunable frequency Microwave Electrothermal Thruster propulsion module for primary propulsion and altitude control of a satellite/spacecraft in space. More particularly, the present invention is directed to provide a tunable frequency Microwave Electrothermal Thruster for propulsion control of satellite/spacecraft involving advancement in constructional features including RF Semiconductors as microwave generator in place of conventional bulky magnetron. The advancement is directed to increase efficiency and respond time and to make the thruster capable of operating in two frequencies by mechanically tuning its cavity while at the same time making such thruster compact and light weight. Advantageously, the thruster is directed to perform the task of both primary propulsion and for altitude control.

BACKGROUND OF THE INVENTION

It is known in the related field that the microwave electrothermal thruster (MET) is an electric propulsion device that uses microwaves to heat a gaseous propellant. The MET is an electrothermal propulsion device which can function at both low and high power levels (10 W-3 kW) suitable for microsatellite and large satellite applications. Its electrode less design allows it to provide steady and stable operation with negligible erosion to the device. Microwave energy is fed into an electromagnetic resonant cavity to ignite and sustain free-floating plasma, which heats the propellant gas. The heated propellant is then accelerated through a gas dynamic nozzle and exhausted to generate thrust. The heating mechanism is similar to that of an arc jet, which utilizes an arc discharge formed between two electrodes to heat a propellant gas.

According to prior approaches, one of the main drawbacks in Microwave Electrothermal Thruster (MET) has been their use of microwave signal generator and high power amplifier plus their use of a coupler between the generator/amplifier and the resonant cavity. It also contains various impedance matching equipment and microwave waveguides. Such hardware greatly adds to the complexity, weight and overall size of the propulsive system, making it impractical for spaceflight. This complex design architecture would make the MET difficult to be adopted as means of primary propulsion on a satellite.

One more drawback in Microwave Electrothermal Thruster (MET) according to prior approaches has been their use of fuels ($H_2$, He, $NH_3$, Hydrazine). These fuels are difficult to store for prolonged periods in space and fuels such as hydrazine is extremely toxic to handle. These fuels also occupy more space, which results in lower usable payload volume. Also, in prior approaches, it was difficult to optimize the MET platform for use with different fuels. This has led to the non-realization of MET platform in space.

Another main drawback in MET thrusters according to prior approaches is the use of water vapour as fuel. This procedure involves converting water to steam in the frigid vacuum of space, it is a complex challenge to convert it to steam in space by maintaining accurate mass flow in the order of mg/s.

The foregoing problems are overcome, and other advantages are provided not only eliminating the waveguide and impedance matching equipment but also eliminating the signal generator-amplifier or bulky magnetron and also optimizing it to run on various inert gases and providing a safe way to run on both toxic and non-toxic liquid fuels.

In prior approaches, signal generator-amplifier unit or bulky magnetrons were used to generate microwaves and these hardware greatly adds to the weight and size of the system making it impractical for spaceflight. Also, in prior approaches, the MET was designed to operate in one single frequency, which again limited its practicality for different orbital maneuvers.

The foregoing problems are overcome by eliminating the impractical hardware and involving advancements including RF Semiconductor technology, which advantageously reduces overall weight and increases the performance of MET. This also allows the MET to operate in dual frequency mode, for which an innovative mechanism is introduced into the MET to make it more practical for spaceflight.

OBJECTS OF THE INVENTION

The basic object of the present invention is directed to provide a Microwave Electrothermal Thruster adapted for in-space electrothermal propulsion for primary propulsion and altitude control of a satellite/spacecraft in space.

A further object of the present invention is directed to provide a Microwave Electrothermal Thruster adapted for in-space electrothermal propulsion comprising a tunable frequency Microwave Electrothermal Thruster module to eliminate use of the waveguide and impedance matching equipment as well as the signal generator amplifier or bulky magnetron to reduce the overall weight of the thruster.

Another object of the present invention is directed to provide a tunable frequency Microwave Electrothermal Thruster which would be optimized to run on various inert gases and providing a safe way to run on both toxic and non-toxic liquid fuels.

A further object of the present invention is directed to provide a tunable frequency Microwave Electrothermal Thruster which introduces RF Semiconductors as microwave generator in place of conventional bulky magnetron, to increase its efficiency and respond time making the thruster module compact and light weight and thus ensuring higher payload volume.

A still further object of the present invention is directed to provide a tunable frequency Microwave Electrothermal Thruster which would be capable of operating in two frequencies by mechanically tuning its cavity making it suitable for propulsion and altitude control of satellite/spacecraft in space.

A still further object of the present invention is directed to provide a tunable frequency Microwave Electrothermal Thruster wherein metallurgy of the thruster cavity is also optimized to operate in both toxic and non-toxic fuels including water vapour as propellant.

Another object of the present invention is directed to provide a tunable frequency Microwave Electrothermal Thruster wherein the mechanically tunable resonant cavity design allows the thruster to operate at two different frequencies at different power levels, thus enabling the satellite to initiate required orbital maneuvers.

Yet another object of the present invention is directed to provide a tunable frequency Microwave Electrothermal Thruster wherein Shape Memory Alloy is introduced into the thruster cavity to enable faster and effective tuning of the resonant cavity diameter, when switching between two operational frequencies.

A still further object of the present invention is directed to provide a tunable frequency Microwave Electrothermal Thruster wherein lower weight and dual frequency mode operation of the device, enable higher payload capacity and cheap launch cost of vehicles and increased orbital life span of satellites can be achieved by employing the invention.

SUMMARY OF THE INVENTION

Thus according to the basic aspect of the present invention there is provided a Microwave Electrothermal Thruster adapted for in space electrothermal propulsion comprising, at least one primary resonant cavity with nozzle for exiting generated heated plasma in said primary resonant cavity to create desired thrust;
said primary resonant cavity having injector port opening for injection of propellant/fuel including water based fuel;
RF semiconductor based microwave generator for generation of microwaves for emitting into the said primary resonant cavity body for interaction with said fuel to create heated gas plasma for generating said thrust when exiting through said nozzle.

A preferred embodiment of the present Microwave Electrothermal Thruster for tunable variable frequency based operation comprises
mechanically tunable variable size of primary resonant cavity matching to variable frequency operation;
actuator for selectively opting for a desired variable size of said tunable primary resonant cavity;
said tunable primary resonant cavity of any selected desired size for selective frequency of operation having injector port opening for injection of propellant gas/water based fuel;
RF semiconductor based microwave generator for generation of microwaves for emitting into the said tunable primary resonant cavity for interaction with said fuel to create heated gas plasma;
electromagnets surrounding at least a part of said resonant cavity to aid rotation of plasma inside cavity and enable effective convective heat transfer between plasma and propellant gas;
nozzle means operatively connected to said tunable primary resonant cavity for exiting the generated heated plasma to create desired thrust.

According to another aspect, the present Microwave Electrothermal Thruster comprises switching means for switching the electromagnets on and off around the primary resonant cavity in a clockwise manner.

According to another aspect in the present Microwave Electrothermal Thruster, the external electromagnets have variable field strength to favour selectively position the plasma axially centered to the nozzle avoiding the plasma to contact the primary resonant cavity surfaces.

According to another aspect in the present Microwave Electrothermal Thruster configured to operate as a dual low and high frequency mode operable thruster comprises
mechanically tunable variable size of said resonant primary cavity having a first cavity body and a second cavity body matching to said low or high frequency mode operation constituting
(i) a low frequency operation mode primary resonant cavity of larger diameter and length defined by said second cavity body and said first cavity body in combination surrounded by the external electromagnets or (ii) high frequency operation mode primary resonant cavity of relatively smaller diameter and length having defined by said cavity body only and surrounded by the external electromagnets.

According to another aspect in the present Microwave Electrothermal Thruster, the first cavity body surrounded by the external electromagnets is configured to move coaxially with respect to the second cavity body to change length of the primary resonant cavity;
said second cavity having smaller diameter with respect to the first cavity body being configurable to reside within the first cavity body firmly attached to a base plate.

According to another aspect in the present Microwave Electrothermal Thruster, the actuator for selectively opting for the high frequency operation mode primary resonant cavity of relatively smaller diameter and length enabling coaxially moving the first cavity body surrounded by the external electromagnets to move whereby the second cavity body of relatively smaller diameter enters into said first cavity body and telescopically nest therein for effective desired reduction in length of said primary resonant cavity for desired plasma generation and exiting through said nozzle.

According to another aspect in the present Microwave Electrothermal Thruster, the actuator for selectively opting for the low frequency operation mode primary resonant cavity of relatively large diameter and length enabling coaxially moving the first cavity body surrounded by the external electromagnets to move whereby the first cavity body mates with fixed circular O-ring section of the second cavity body forming the primary resonant cavity defined by the second and the first cavity body in combination for the low frequency operation mode.

According to another aspect in the present Microwave Electrothermal Thruster, the first cavity body includes a separate propellant injection unit for its operation in the low frequency mode operation and the second cavity body includes its separate propellant injection for its operation in the high frequency mode operation.

According to another aspect in the present Microwave Electrothermal Thruster, the first cavity body comprises viewing window to view the plasma formation in the primary resonant cavity.

According to another aspect in the present Microwave Electrothermal Thruster, the microwave generator comprising a RF semiconductor having a coaxial output stub inserted with respect to the adjacent second cavity body to excite a transverse magnetic, azimuthally symmetric, bisymmetrically along the axis of the second cavity body for heating the plasma with sole impedance matching element between the microwave generator and the primary resonant cavity comprising an antenna attached to said output stub, said antenna projecting into the said second cavity body close to said base plate also supporting said RF semiconductor and adapted such that:
when the thruster operates in low frequency the primary resonant cavity is activated through injection of the propellants through the injection unit of the first cavity body and activation of the microwave generator involving said RF semiconductor with the cooperative antenna to thereby generate the heated plasma; or
when the thruster operates in high frequency the primary resonant cavity is activated through injection of the propellants through the injection unit of the second cavity body and activation of the microwave generator involving said RF semiconductor with the cooperative antenna to thereby generate the heated plasma.

According to another aspect, the present Microwave Electrothermal Thruster comprises means to reduce the primary resonant cavity diameter when the thruster operates in high frequency mode, comprising an electrically actuated heat resistant Shape Memory Alloy (SMA) sheet attached to second end plate of the second cavity body, said second end plate includes inner guide rails/groove to guide the SMA during its actuation such that the SMA self-actuate to increase and decrease the diameter of the second cavity wall for desired for optimum tuning whereby the actuator enabling the first cavity body to move coaxially governed by electrically actuated co-axial tube and actuator obstruction free insertion of the second cavity body into said first cavity body along its lower end facing said second cavity body along with open multiple cylindrical plates disposed in inner wall of the first cavity body separated from the each other providing larger diameter in the first cavity body allowing the second cavity body to nest within the first cavity body.

According to another aspect in the present Microwave Electrothermal Thruster, the cylindrical plates of said first cavity body are actuated automatically towards its center by solenoid actuators closing inter cylindrical plate gap to form a circular cavity when the first cavity body mates with the fixed circular O-ring section of the second cavity body to increase in co-axial length and diameter of the cavity and aid in the low frequency high power mode operation.

According to another aspect in the present Microwave Electrothermal Thruster, the propellant/fuel includes selectively inert gases, water and ammonia which upon injection into the select resonant cavity in its liquid or gaseous state get vaporized by the microwave fields and low pressure which then breaks down electrically and forms desired plasma in the microwave discharge which upon heating forms high velocity rocket exhaust.

According to another aspect in the present Microwave Electrothermal Thruster, the low and high frequency operation comprises of low frequency of 2.4 GHz and high frequency of 7.5 GHz.

According to another aspect in the present Microwave Electrothermal Thruster, the microwave antenna is of predetermined wavelength and is carried by a first end of the second cavity body, said microwave antenna coupled to a RF semiconductor for generation of microwaves for interaction with said fuel such as to heat fuel and generate said heated gas plasma preferably having said predetermined wavelength of less than 2 wavelength.

According to another aspect, the present Microwave Electrothermal Thruster, the comprises a secondary resonant cavity between said nozzle and said primary resonant cavity to aid secondary plasma formation and increase exhaust temperature and speed of exiting gas.

According to another aspect in the present Microwave Electrothermal Thruster, the nozzle is made of titanium fused with refractory oxides to withstand high temperature of exhaust gas and to minimize nozzle erosion.

According to another aspect in the present Microwave Electrothermal Thruster, the microwave antenna comprises of fused RF semiconductor with tunable frequency.

The various features of novelty which characterize the invention are pointed out particularly in the claims annexed hereto and forming a part of this disclosure. For a better understanding of the invention, its advantages and objects, reference is made to the accompanying drawings and descriptive matter in which a preferred non-limiting embodiment of the invention is illustrated.

BRIEF DESCRIPTION OF THE ACCOMPANYING DRAWINGS

FIG. 4: illustrates (A) front view and (B) back view of an embodiment of the MET device of the invention in compact mode for high frequency operation;

FIG. 6A-6E: illustrates an embodiment of the MET device of the invention using cavity end plate which contains inner guide rails/groove to guide SMA during its actuation;

FIG. 7A-7D: illustrates an embodiment of the MET device of the invention using cylindrical plates for adjusting inner cavity diameter during movement.

DETAILED DESCRIPTION OF THE INVENTION WITH REFERENCE TO THE ACCOMPANYING DRAWINGS

The present invention is directed to provide a Microwave Electrothermal Thruster adapted for in-space electrothermal propulsion comprising a tunable frequency Microwave Electrothermal Thruster (MET) based propulsion module in order to expand the mission capabilities of larger satellites. The present MET according to a preferred embodiment comprise an electrothermal propulsion device which can function at both low and high power levels (10 W-3 kW) suitable for microsatellite and large satellite applications.

In prior approaches, signal generator-amplifier unit or bulky magnetrons were used to generate microwaves and these magnetrons greatly add to the weight and size of the system making it impractical for spaceflight. Also, in prior approaches, the MET was designed to operate in one single frequency, which again limited its practicality for different orbital maneuvers.

The foregoing problems are overcome in the design of the present MET by eliminating the impractical hardware and introducing novel RF Semiconductor technology, which reduces overall weight and increases the performance of MET. This also allows the MET to operate in dual frequency mode, for which an innovative mechanism is introduced into the MET to make it more practical for spaceflight.

A principal feature of the present invention is the elimination of magnetron and involving RF Semiconductors to generate microwaves. This novel combination involving RF Semiconductors to generate microwaves will enable making the thruster design highly compact and also operate at higher efficiencies.

Due to the introduction of the RF Semiconductor technology, the present advancement for the first time achieves a mechanically tunable resonant cavity design. This tunable feature allows the thruster according to a preferred embodiment to operate at two different frequencies at different power levels, thus enabling the satellite to initiate required orbital maneuvers.

The present MET device according to such a preferred embodiment operates at 2.45 GHz (High power-Low frequency) and 7.5 GHz (Low power-High frequency) mode. The same thruster device can perform the task of both as means of primary propulsion and for altitude control. Also, for the first time, Shape Memory Alloy is introduced into the thruster cavity to enable faster and effective tuning of the resonant cavity diameter, when switching between two operational frequencies.

Among the advantages of the invention are the resultant lower weight and dual frequency mode operation, and therefore cheap launch cost of vehicles and increased orbital life span of satellites employing the invention. Dual frequency mode operation is characterized as follows:

(a) High power-Low frequency—For primary propulsion
(b) Low power-High frequency—For altitude control and station keeping of satellites.

It is important to note that, maximum power generated by a satellite normally do not exceed 5 kW. High power thruster using low frequency can also be used. But, it will limit operation in space as there is no power available beyond 5 kW. Thus for the present MET device, 2.45 GHz has been chosen as the operating frequency for three main reasons: (i) it is an industrial frequency and commercially available; (ii) for orbit raising, an on-board power of >2 kW is required which can be translated for a nominal thrust between 100-300 mN, lower frequency operation (for eg., 915 MHz) required power in excess of 5 kW and higher frequency operation (5.8 GHz and above) is not capable of higher thrust levels (iii) a limited availability of space in a satellite imposes constraints on the size of the thruster to be designed. But for attitude control operation, high power operation is not necessary. Hence a high frequency operation (i.e. 7.5 GHz) is considered where power requirement is very less.

The present MET device according to an embodiment can thus preferably designed for satellites weighing upto 2.5 tones. These satellites have solar panels that are capable of generating an on-board power of 3-5 kW. Out of the total generated power, 2 kW can be used for the operation of the thruster during orbit raising. An additional power of 100 W is required for operation of electromagnet circuit and actuators associated with the MET device. This power is independent of the 2 kW power requirement and can be supplied by satellite bus. The power source is independent of the thruster design and is an integral part of the satellite.

Figure 1:
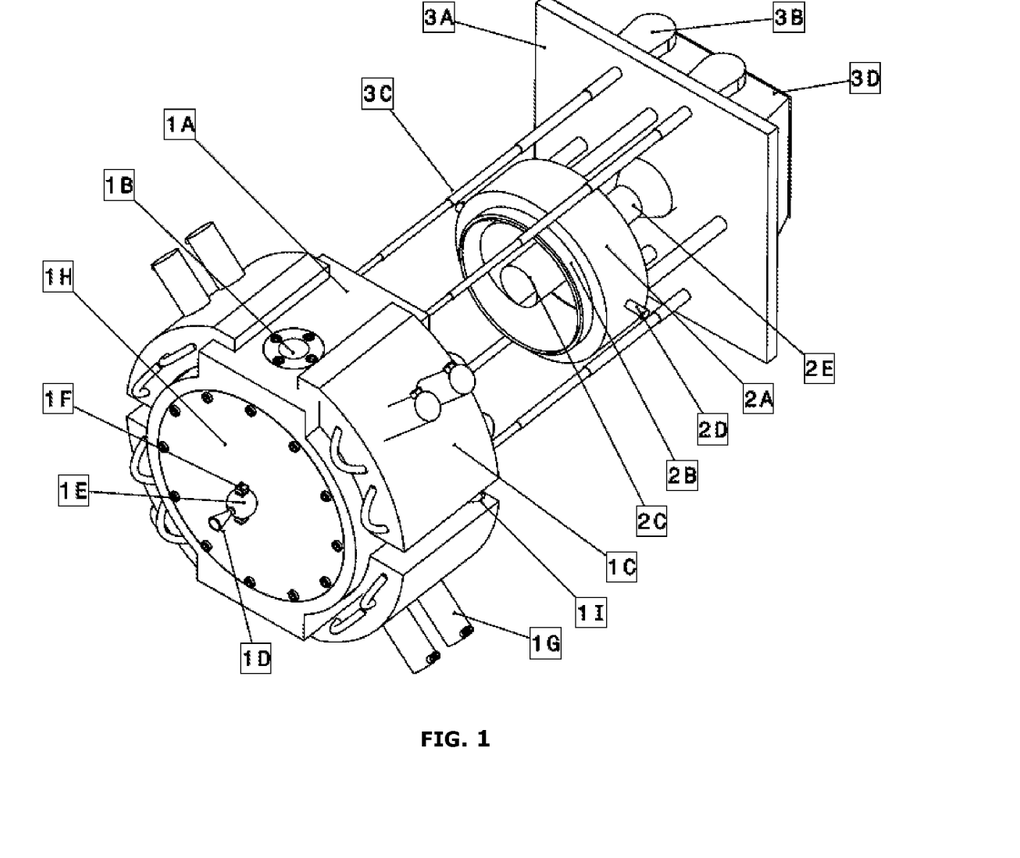
FIG. 1: is a schematic diagram of an embodiment of the Microwave Electrothermal Thruster (MET) according to the present invention.
Figure 2:
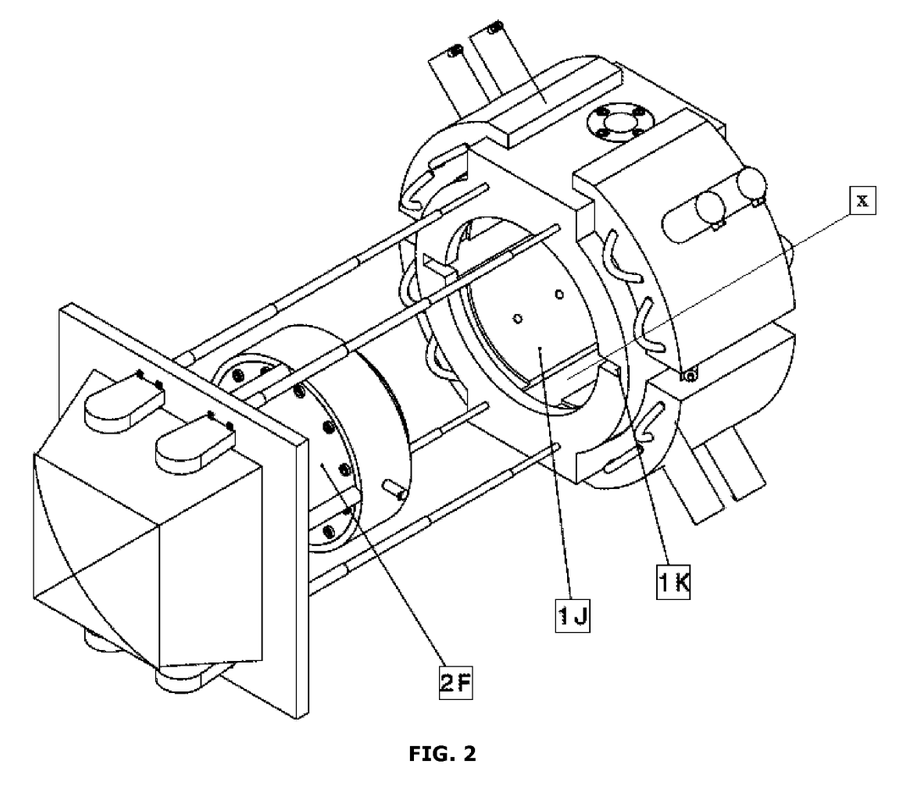
FIG. 2: illustrates another view of the embodiment of the MET device shown in FIG. 1, using a movable coaxial cavity part and its inner view.
Figure 3:
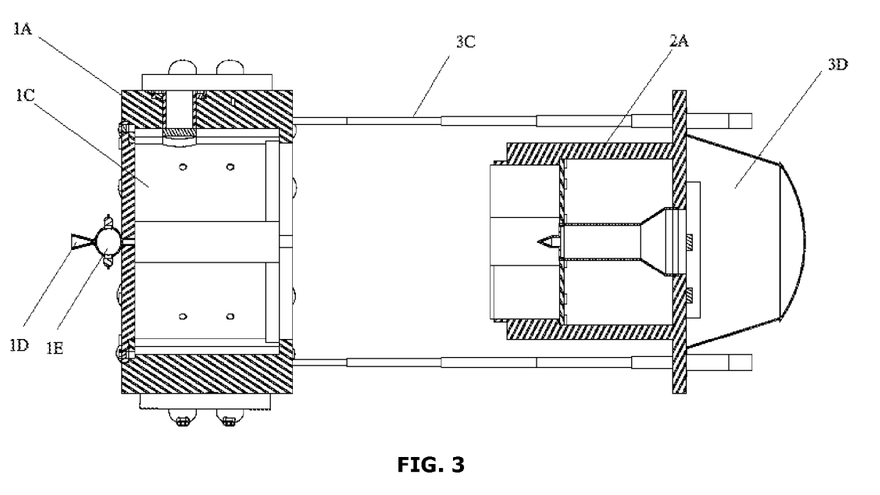
FIG. 3: illustrates an embodiment of the MET device of the invention in cut-section.

Referring first to FIGS. 1 & 2, wherein a Microwave Electrothermal Thruster (MET) device according to a preferred embodiment comprises a mechanically tunable resonant cavity body (1A; 2A constituting a primary resonant cavity) wherein the first cavity body (1A) is movable while second cavity body (2A) having smaller diameter with respect to the first cavity body (1A) configured to reside within the first cavity body (1A) is kept stationary as has been illustrated, having a first end (1H) of said first cavity body (1A) and second end (2H) of said second cavity body (2A), four injection ports (1I; 2D) in the cavity body (1A; 2A) for the injection of propellant, a multi-frequency microwave antenna (2E) carried by the second end (2H) of the second cavity body (2A). The microwave antenna (2E) is coupled to a RF Semiconductor contained in a avionics compartment (3D) which generates microwaves that are emitted into the cavity body (1A; 2A) where they interact with and heat the propellant so as to create a heated dense gas plasma which exits from the primary resonant cavity through nozzle (1D) in the first end (1H) of the first cavity body (1A), it creates a thrust to control/propel the spacecrafts/satellites.

A secondary resonant cavity (1E) equipped with an additional RF Semiconductor (1F) is operatively connected with the nozzle (1D) to aid a secondary plasma formation. Importantly, the said secondary resonant cavity (1E) generated secondary plasma increases the temperature of the exhaust propellant gas from the primary resonant cavity resulting higher specific impulse for achieving necessary specific impulse required to perform obit raising operations for the spacecrafts/satellites.

Preferably, the present Microwave Electrothermal Thruster (MET) may be operated with a dual frequency RF Semiconductor fixed to a tunable ¼ free-space wavelength antenna inserted directly into the second cavity body (2A) with no intermediate waveguide. This advancement leads to the omission of bulky & less efficient magnetron, signal generator-amplifiers and results in a much more compact and lightweight design for the Microwave Electrothermal Thruster (MET), that has been previously demonstrated for the MET and thus makes the Microwave Electrothermal Thruster (MET) an attractive technology for spaceflight.

A microwave generator, in this case the RF Semiconductor contained in the avionics compartment (3D) is joined directly with the primary resonant cavity in a coaxial configuration with an output stub of the microwave generator inserted into the approximately primary resonant cavity to excite a transverse magnetic, azimuthally symmetric, bisymmetrically along the axis (TM010 mode) for the purposes of heating a plasma which acts as a thermal rocket exhaust.

In the present MET device for thrusting, the TM modes are preferred as it is found that the TM modes do not show variation in resonant angular frequency with respect to the geometry of the resonant cavity. The electric fields in TM mode are constant whereas in TE mode can be deflecting. For oscillations generally TM0n0 mode is preferred because it supports multiple frequencies depending upon the value of n. There is no electric field component in the z-axis so there is no particle deflection or interference with particle acceleration. The electric field intensities are constant and there is no variation in angular resonant frequency with respect to the geometry of the resonant cavity.

The resonance condition of the primary resonant cavity is approximated due to the loading of the cavity by the discharge. The sole impedance matching element between the microwave generator and the primary resonant cavity is the antenna attached to the output stub of the generator tuned to be ¼ of a free space wavelength in effective length and this antenna projects into the primary resonant cavity. This allows a lighter MET device to be used in space.

Since, the present MET device according to such preferred embodiment is configured to operate in two different frequencies; the antenna is adapted to operate in those particular frequencies alone. The size of the primary resonant cavity has also a direct effect on the length of the antenna. In the present MET device according to such preferred embodiment, for high frequency and low frequency operation, the antenna length is varied with respect to the size of the primary resonant cavity.

The primary resonant cavity confines electromagnetic fields in the microwave region of the spectrum. The microwave emitted from the antenna resonates/vibrates when entering into the primary resonant cavity. The primary resonant cavity dimensions are arrived based on the frequency and can be determined such as using the relation:

$$f_{mnp} = \frac{c}{2\pi\sqrt{\mu_r \varepsilon_r}} \sqrt{\left(\frac{X_{mn}}{R}\right)^2 + \left(\frac{p\pi}{L}\right)^2}$$

where, $f_{mnp}$ is the input frequency in GHz;
R is the radius of the cavity;
L is the length of the cavity;
$X_{mn}$ represents the $n^{th}$ zero of the mth Bessel function;
$X'_{mn}$ represents the $n^{th}$ zero of the derivative of the $m^{th}$ Bessel function.

The above relation implies that, for a lower frequency, the value of R and L is higher and for a higher frequency, the value of R and L is lower.

As described, the present MET device is adapted to operate in dual frequency mode. This feature requires the thruster to mechanically tune the primary resonant cavity to operate in different frequency, i.e. according to a preferred embodiment, the first cavity body (1A) will move coaxially to change length and change the inner diameter of the second cavity body (2A) wall.

Refereeing to FIG. 1 and FIG. 2, the second cavity body (2A) is firmly attached to a base plate (3A) and the first cavity body (1A) is configured to move coaxially with respect to the second cavity body (2A). The coaxial movement of the first cavity body (1A) is governed by electrically actuated co-axial tube (3C) and actuator (3B).

The first cavity body (1A) is surrounded by external electromagnets (1C). Since the plasma reacts to electric and magnetic fields, these electromagnets (1C) aid the rotation of the plasma inside the primary resonant cavity. The rotation of the plasma is caused from switching the electromagnets (1C) on and off around the cavity in a clockwise manner. This will enable effective convective heat transfer between plasma and the propellant gas.

The electromagnetic field strength of the external electromagnets (1C) is fixed to certain values to make sure that the plasma is axially centered to the nozzle (1D).

Also in FIG. 1, (1I) forms the propellant injection unit for first cavity body (1A) when operated in the low frequency mode, whereas (2D) forms the propellant injection unit for second cavity body (2A) when operated in the high frequency mode. Viewing window (1B) is provided in the first cavity body (1A) to view the plasma formation.

Figure 4A:
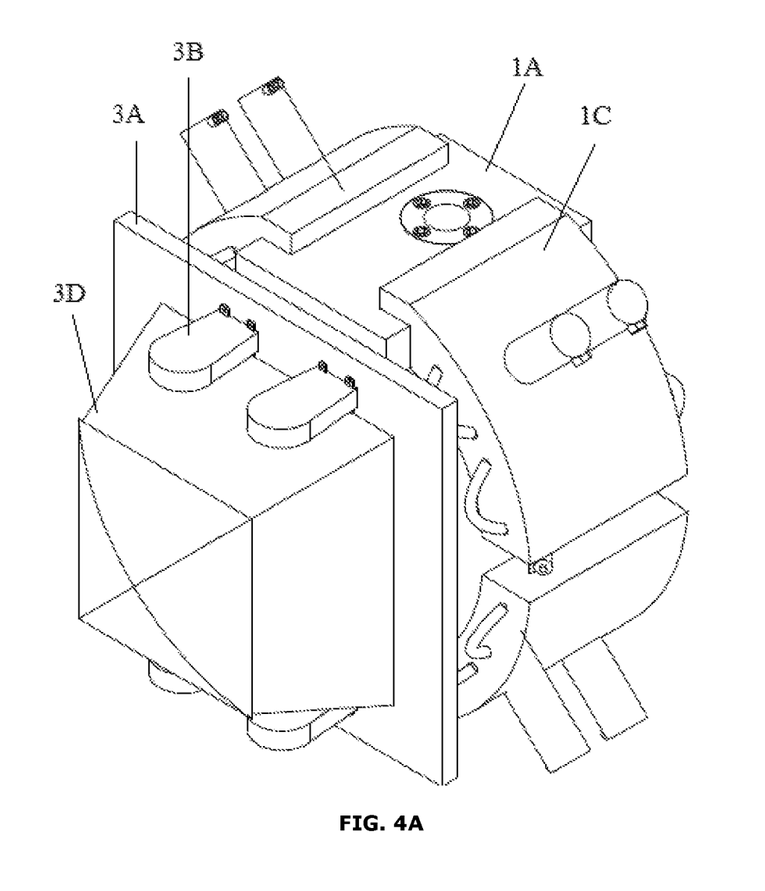
Figure 4B:
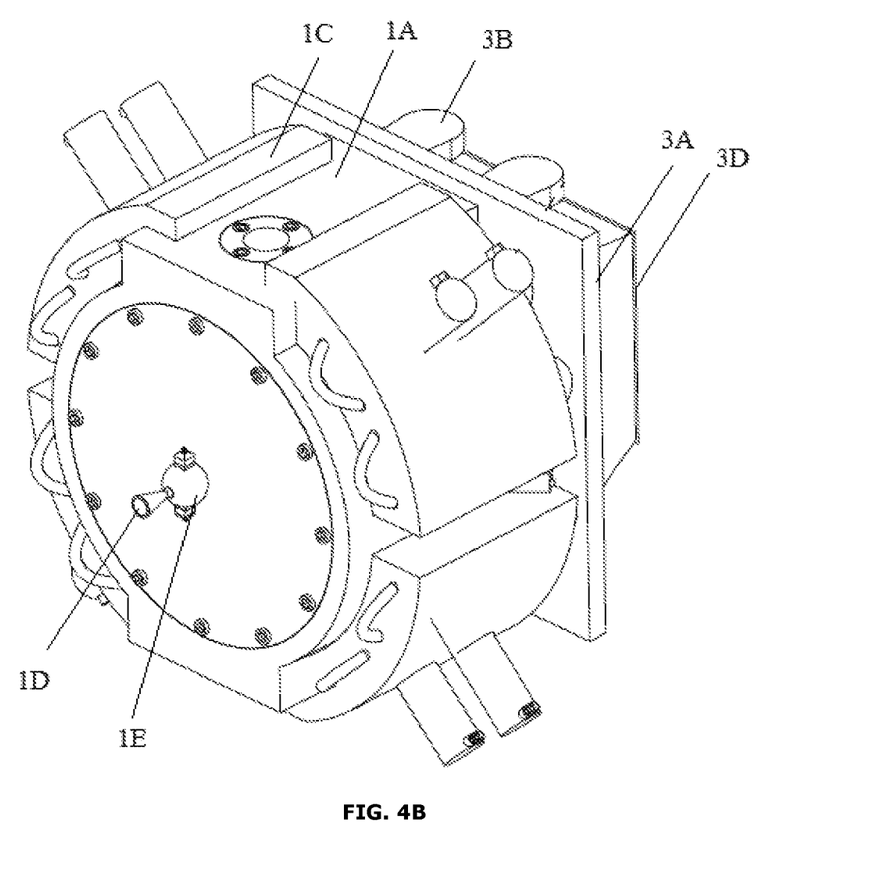

When the present MET device operates in high frequency mode, the primary resonant cavity is reduced forming a compact structure with reduced cavity length and diameter as shown in FIGS. 4A and 4B. For this, the first cavity body (1A) coaxially actuates towards the second cavity body (2A) and telescopically nests the said second cavity body (2A) within it.

The diameter of the primary resonant cavity which is effectively defined by only the second cavity body (2A) in high frequency mode is further reduced by involving an electrically actuated heat resistant Shape Memory Alloy (SMA) sheet. The SMA is attached to the second end (2H) of the second cavity body (2A).

Figure 6:
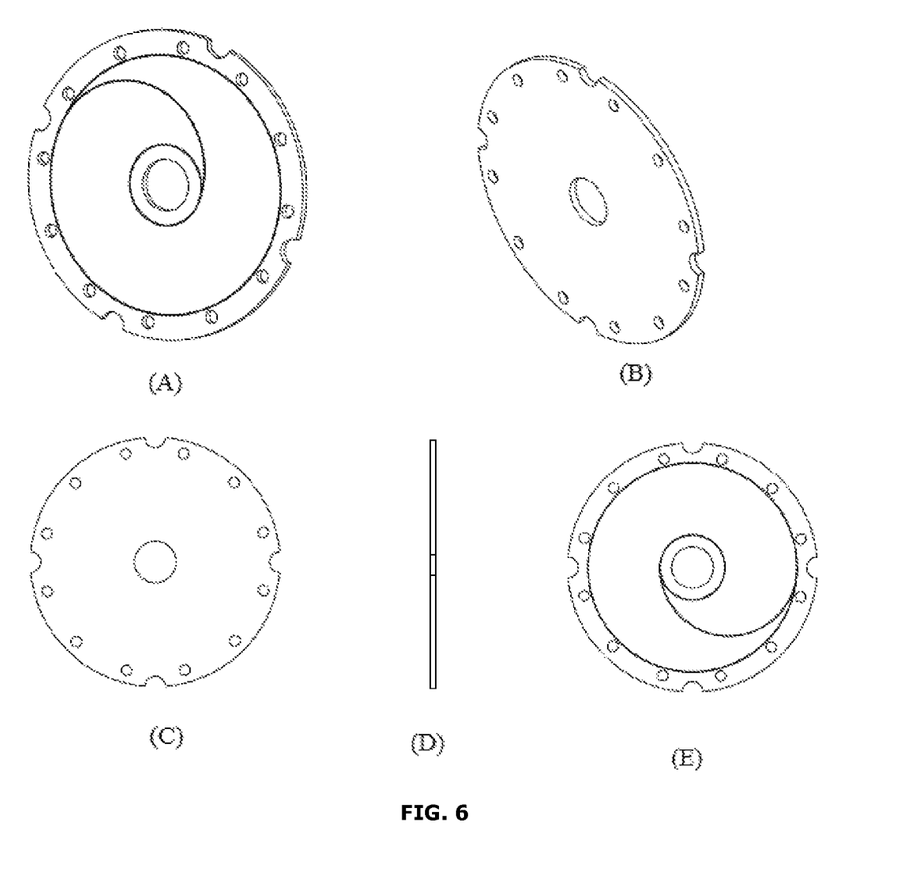

The second end plate (2H) contains inner guide rails/groove (shown in the FIG. 6A-6E) to guide the SMA during its actuation. This SMA will self-actuate to increase and decrease the diameter of the second cavity wall (2A) when desired for optimum tuning. Also in FIG. 1, the avionics compartment (3D) contains the dual frequency RF Semiconductor unit and control boards.

In this thruster design, a two way SMA is used. A two way SMA can be trained to remember two different shapes when electrically actuated at different voltages. The guide rail is used here to properly guide the SMA during cavity diameter tuning. Though SMA remembers its shape, the guide rail further makes sure that there is no variation with respect to time. The SMA material used is NITINOL.

Refereeing the present MET device according to the embodiment, shown in FIG. 2, a slit (1K) is provided on the first cavity body (1A) to provide obstruction free path to the propellant injector (2D) attached to the second cavity body (2A) while it is telescopically nesting within the first cavity body (1A) upon contraction in high frequency mode.

Figure 7:
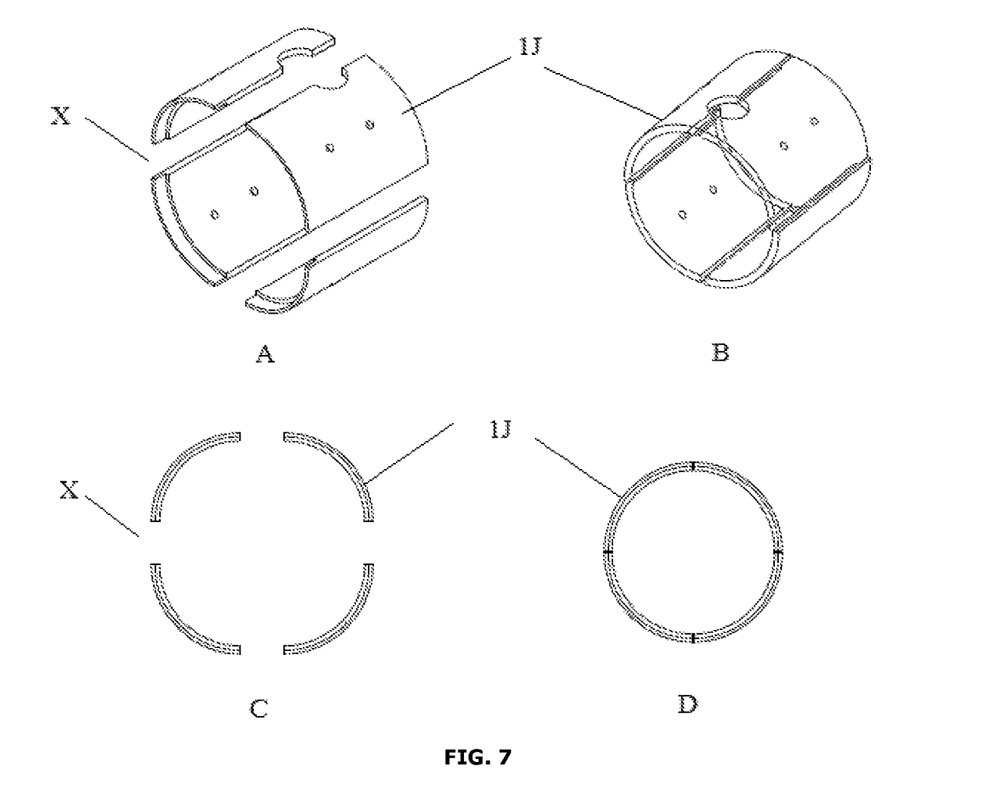

The present thruster according to the embodiment, shown in FIG. 2, includes multiple cylindrical plates (1J) (also in FIG. 7) in the first cavity body (1A). The cylindrical plates (1J) are disposed in the inner wall of the first cavity body (FIG. 7) and configured to actuate in a reciprocating mechanism by solenoid actuators (1G-FIG. 1) attached to the first cavity body (1A).

In the high frequency mode, the cylindrical plates (1J) are disposed in the inner wall of the first cavity body (1A) separated from the each other (shown in the FIGS. 7A and 7C) providing larger diameter in the first cavity body (1A) allowing the second cavity body (2A) to nest within the first cavity body (1A).

Figure 5A:
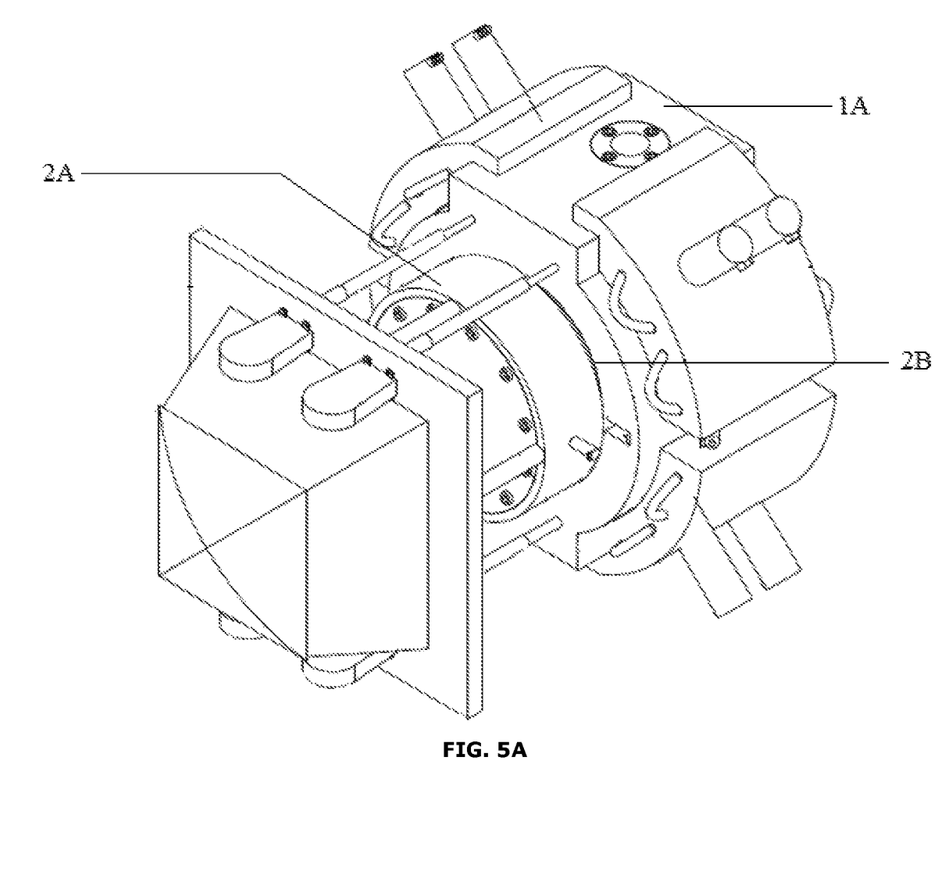
FIG. 5A illustrates an embodiment of the MET device of the invention in non-compact mode for low frequency operation.
Figure 5B:
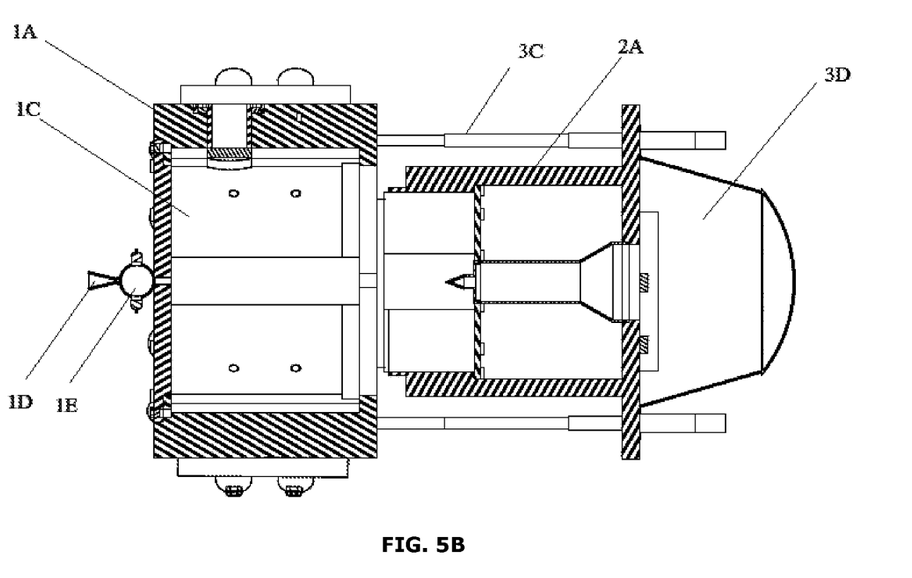
FIG. 5B illustrates an embodiment of the MET device of the invention in cut-section for low frequency operation.

When operating in low frequency mode, these cylindrical plates (1J) actuated towards its center by the solenoid actuators (1G) close down inter cylindrical plate gap to form a circular cavity (shown in the FIGS. 7B and 7D). These plates are automatically actuate towards its center when the first cavity body (1A) mates with fixed circular O-ring section (2B) of the second cavity body (2A) during low frequency mode operation thus forming the primary resonant cavity defined by the second and the first cavity body in combination to aid in the low frequency-high power mode operation. The cavity body construction in the low frequency configuration is shown in the accompanying FIG. 5A and FIG. 5B.

Also, in accordance with one important aspect of the present invention, the fuel preferably comprises inert gases, water or ammonia. A source of inert propellants, pure or impure water or ammonia is injected either in its gaseous or liquid state into the thrust chamber of the MET device where it is vaporized by the microwave fields and low pressures experienced therein. The vaporized water then breaks down electrically and forms the plasma in the microwave discharge, which is heated to form a high velocity rocket exhaust.

The experimental trial of the Microwave Electrothermal Thruster (MET) device according to the present invention conducted for validating its suitability in respect of efficient primary propulsion and altitude control of satellite/spacecraft in space using a wide range of propellants and results obtained are presented in the following Example I:

Example I

A prototype experiment was conducted in which a FreeScale's MHT1002N 2.45/7.5 GHz semiconductor pair was attached to a resonant mode cavity of dimensions 153 mm (antenna end plate to nozzle end plate) and a diameter of 101 mm. The protruding antenna length was 2.5 mm. These dimensions are calculated to work on the frequency 2.45 GHz. As explained above, these are the dimensions to operate in low frequency-high power mode. The MET's tuning mechanism was actuated to operate in this mode. The MET performed in the direct insertion mode just as it had at the end of the waveguide and the discharge was unchanged. The introduction of solid-state RF Semiconductor solution delivered controlled energy to the load, with real-time feedback and monitoring of temperature, power and cavity conditions. The performance parameters were monitored and found to be more efficient and precise when compared to prior approaches which used bulky magnetron and signal generator-amplifier hardware. Due to the high-resolution control of the FreeScale's MHT1002N RF Semiconductor, the plasma formed was dense and exactly centered in the cavity while proving a minimal Q discharge. The voltage required to operate the MHT1002N is just 28V when compared to 3000V for a magnetron. This operating feature made the power conditioning unit very small and weighing around just 120 grams.

The same thruster was then operated at high frequency-low power mode at 7.5 GHz. This meant to change the dimensions of the thruster's resonant cavity body. The dimensions arrived were 64 mm cavity length and 30 mm cavity diameter. As seen in (FIG. 4), the thruster had contracted. The mechanical actuators worked as expected and the experiment was conducted. The results were found to be on par with a rigid type of construction under the same dimensions. The results under both modes of operations are presented in following Table I.

TABLE I

| Fuel/Propellant | Water | Argon | Helium |
| --- | --- | --- | --- |
| Power Input | 2 kW | 900 W | 250 W |
| Thrust Generated | 203 mN | 40 mN | 9 mN |
| Specific Impulse | 850 s | 707 s | 700 s |

It is thus possible by way of the present invention to provide a tunable microwave electrothermal thruster introducing RF Semiconductors to operate MET's, which results in overall increase in performance and reduced weight. Also described is a novel way to operate the thruster in dual frequencies efficiently for orbital maneuvers and a manner of making and using the invention.

While a specific embodiment of the invention has been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure. Thus, the invention is not limited to the specific embodiment described herein, but is defined by the appended claims.

The invention claimed is:

1. A Microwave Electrothermal Thruster adapted for in space electrothermal propulsion and tunable variable frequency based operation comprising,
    at least one tunable primary resonant cavity with a mechanically tunable resonant cavity matching to said variable frequency operation and nozzle for exiting generated heated plasma in said tunable primary resonant cavity to create desired thrust;
    actuator for selectively opting for a desired variable size of the tunable primary resonant cavity;
    said tunable primary resonant cavity of any selected desired size for selective frequency of operation having injector port opening for injection of propellant/fuel including water based fuel;
    Radio Frequency (RF), semiconductor based microwave generator for generation of microwaves for emitting into the tunable primary resonant cavity body for interaction with said fuel to create heated gas plasma for generating said thrust when exiting through said nozzle; and
    electromagnets surrounding at least a part of the tunable primary resonant cavity to aid rotation of plasma inside cavity and enable effective convective heat transfer between plasma and propellant gas.

2. The Microwave Electrothermal Thruster as claimed in claim 1 wherein said propellant/fuel includes selectively inert gases, water and ammonia which upon injection into the tunable primary resonant cavity in its liquid or gaseous state get vaporized by the microwave fields and low pressure which then breaks down electrically and forms desired plasma in the microwave discharge which upon heating forms high velocity rocket exhaust.

3. The Microwave Electrothermal Thruster as claimed in claim 1, comprising a switch for switching the electromagnets on and off around the tunable primary resonant cavity in a clockwise manner.

4. The Microwave Electrothermal Thruster as claimed in claim 1, wherein the external electromagnets have variable field strength to favour selectively position the plasma axially centered to the nozzle avoiding the plasma to contact the tunable primary resonant cavity surfaces.

5. The Microwave Electrothermal Thruster as claimed in claim 1, comprising a secondary resonant cavity between the nozzle and the tunable primary resonant cavity to aid secondary plasma formation and increase exhaust temperature and speed of exiting gas.

6. The Microwave Electrothermal Thruster as claimed in claim 5 wherein the nozzle is made of titanium fused with refractory oxides to withstand exhaust gas temperature and to minimize nozzle erosion.

7. The Microwave Electrothermal Thruster as claimed in claim 1, which is a dual low and high frequency mode operable thruster comprising:
    mechanically tunable variable size of tunable resonant primary cavity having a first cavity body and a second cavity body matching to said low or high frequency mode operation constituting
    (i) a low frequency operation mode of the tunable primary resonant cavity of larger diameter and length defined by said second cavity body and said first cavity body in combination surrounded by the external electromagnets or
    (ii) high frequency operation mode of the tunable primary resonant cavity of relatively smaller diameter and length having defined by said second cavity body only and surrounded by the external electromagnets.

8. The Microwave Electrothermal Thruster as claimed in claim 7, wherein the first cavity body includes a separate propellant injection unit for its operation in the low frequency mode operation and the second cavity body includes its separate propellant injection for its operation in the high frequency mode operation.

9. The Microwave Electrothermal Thruster as claimed in claim 7, wherein the first cavity body comprises viewing window to view the plasma formation in the tunable primary resonant cavity.

10. The Microwave Electrothermal Thruster as claimed in claim 7 wherein said low and high frequency operation comprises of low frequency of 2.4 GHz and high frequency of 7.5 GHz.

11. The Microwave Electrothermal Thruster as claimed in claim 7, comprises an electrically actuated heat resistant Shape Memory Alloy (SMA) sheet attached to second end plate of the second cavity body for reducing the tunable primary resonant cavity diameter when the thruster operates in high frequency mode, said second end plate includes inner guide rails/groove to guide the SMA during its actuation ensuring the SMA is self-actuates to increase and decrease the diameter of the second cavity wall for desired for optimum tuning whereby the actuator enabling the first cavity body to move coaxially governed by electrically actuated co-axial tube and actuator obstruction free insertion of the second cavity body into said first cavity body along its lower end facing said second cavity body along with open multiple cylindrical plates disposed in inner wall of the first cavity body separated from the each other providing larger diameter in the first cavity body allowing the second cavity body to nest within the first cavity body.

12. The Microwave Electrothermal Thruster as claimed in claim 11 wherein the cylindrical plates of said first cavity body are actuated automatically towards its center by solenoid actuators closing inter cylindrical plate gap to form a circular cavity when the first cavity body mates with the fixed circular O-ring section of the second cavity body to increase in co-axial length and diameter of the cavity and aid in the low frequency high power mode operation.

13. The Microwave Electrothermal Thruster as claimed claim 7, wherein the first cavity body surrounded by the external electromagnets, moves coaxially by the actuator with respect to the second cavity body to change length of the tunable primary resonant cavity;

said second cavity having smaller diameter with respect to the first cavity body being configurable to reside within the first cavity body firmly attached to a base plate.

14. The Microwave Electrothermal Thruster as claimed in claim 13, wherein the actuator for selectively opting for the high frequency operation mode of the tunable primary resonant cavity of smaller diameter and length enabling coaxially moving the first cavity body surrounded by the external electromagnets to move whereby the second cavity body of relatively smaller diameter enters into said first cavity body and telescopically nest therein for effective desired reduction in length of the tunable primary resonant cavity for desired plasma generation and exiting through said nozzle.

15. The Microwave Electrothermal Thruster as claimed in claim 13, wherein the actuator for selectively opting for the low frequency operation mode of the tunable primary resonant cavity of large diameter and length enabling coaxially moving the first cavity body surrounded by the external electromagnets to move whereby the first cavity body mates with fixed circular O-ring section of the second cavity body forming the tunable primary resonant cavity defined by the second and the first cavity body in combination for the low frequency operation mode.

16. The Microwave Electrothermal Thruster as claimed in claim 13, wherein the microwave generator comprising the RF semiconductor includes a coaxial output stub inserted with respect to the adjacent second cavity body to excite a transverse magnetic, azimuthally symmetric, bisymmetrically along the axis of the second cavity body for heating the plasma with sole impedance matching element between the microwave generator and the tunable primary resonant cavity comprising an antenna attached to said output stub, said antenna projecting into the said second cavity body close to said base plate also supporting said RF semiconductor and ensuring:

when the thruster operates in low frequency mode of the tunable primary resonant cavity is activated through injection of the propellants through the injection unit of the first cavity body and activation of the microwave generator involving said RF semiconductor with the cooperative antenna to thereby generate the heated plasma; or when the thruster operates in high frequency mode of the tunable primary resonant cavity is activated through injection of the propellants through the injection unit of the second cavity body and activation of the microwave generator involving said RF semiconductor with the cooperative antenna to thereby generate the heated plasma.

17. The Microwave Electrothermal Thruster as claimed in claim 16, wherein the microwave antenna is of predetermined wavelength and is carried by a first end of the second cavity body, said microwave antenna coupled to the RF semiconductor for generation of microwaves for interaction with said fuel to heat fuel and generate said heated gas plasma preferably having said predetermined wavelength.

18. The Microwave Electrothermal Thruster as claimed in claim 17, wherein the microwave antenna comprises of a fused RF semiconductor with tunable frequency.

* * * * *